US007537170B2

(12) United States Patent (10) Patent No.: US 7,537,170 B2
Reed et al. (45) Date of Patent: May 26, 2009

(54) MACHINE-READABLE SECURITY FEATURES FOR PRINTED OBJECTS

(75) Inventors: Alastair M. Reed, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 708 days.

(21) Appl. No.: 10/989,737

(22) Filed: Nov. 15, 2004

(65) Prior Publication Data

US 2005/0156048 A1 Jul. 21, 2005

Related U.S. Application Data

(63) Continuation-in-part of application No. 10/836,094, filed on Apr. 29, 2004, and a continuation-in-part of application No. 10/818,938, filed on Apr. 5, 2004, now Pat. No. 6,996,252, and a continuation-in-part of application No. 10/723,181, filed on Nov. 26, 2003, which is a continuation of application No. 09/945,243, filed on Aug. 31, 2001, now Pat. No. 6,718,046.

(60) Provisional application No. 60/523,159, filed on Nov. 17, 2003, provisional application No. 60/475,389, filed on Jun. 2, 2003, provisional application No. 60/466,926, filed on Apr. 30, 2003, provisional application No. 60/430,014, filed on Nov. 28, 2002.

(51) Int. Cl.
*G06K 19/06* (2006.01)
(52) U.S. Cl. .................. 235/494; 235/491; 235/375; 235/487
(58) Field of Classification Search .............. 235/454, 235/457, 487–495; 283/72, 114, 85–92
See application file for complete search history.

(56) References Cited

U.S. PATENT DOCUMENTS 4,504,084 A 3/1985 Jauch (Continued)

FOREIGN PATENT DOCUMENTS

DE 2943436 5/1981

(Continued)

OTHER PUBLICATIONS

U.S. Appl. No. 09/465,418, Rhoads et al., filed Dec. 16, 1999.

(Continued)

*Primary Examiner*—Seung H Lee
*Assistant Examiner*—Christle I Marshall (57) ABSTRACT

The present invention relates generally to documents such as printed documents. One claim recites a printed document including a machine-readable signal. The document includes: a first set of print structures conveyed with first ink; and a second set of print structures convey with optical variable ink. The second set of print structure are provided to cooperate with the first set of print structures so that at a first observation angle the first set of print structures and the second set of print structures appear to provide a first visibly perceptible feature. At a second observation angle, the second set of print structures appear less observable so that the first set of print structures and the second set of print structures provide a second visibly perceptible feature. Of course, other claims and combinations are provided as well.

23 Claims, 7 Drawing Sheets

U.S. PATENT DOCUMENTS

| | | | |
|---|---|---|---|
| 4,725,462 A | 2/1988 | Kimura | |
| 4,739,377 A | 4/1988 | Allen | |
| 4,884,828 A | 12/1989 | Burnham et al. | |
| 5,005,873 A | 4/1991 | West | |
| 5,051,835 A | 9/1991 | Bruehl et al. | |
| 5,093,147 A | 3/1992 | Andrus et al. | |
| 5,291,243 A | 3/1994 | Heckman et al. | |
| 5,385,371 A | 1/1995 | Izawa | |
| 5,458,713 A | 10/1995 | Ojster | |
| 5,481,377 A | 1/1996 | Udagawa et al. | |
| 5,521,722 A | 5/1996 | Colvill et al. | |
| 5,525,798 A | 6/1996 | Berson et al. | |
| 5,530,751 A | 6/1996 | Morris | |
| 5,530,759 A | 6/1996 | Braudaway et al. | |
| 5,557,412 A | 9/1996 | Saito et al. | |
| 5,568,555 A | 10/1996 | Shamir | |
| 5,617,119 A | 4/1997 | Briggs et al. | |
| 5,636,874 A | 6/1997 | Singer | |
| 5,646,997 A | 7/1997 | Barton | |
| 5,652,626 A | 7/1997 | Kawakami et al. | |
| 5,661,574 A | 8/1997 | Kawana | |
| 5,687,236 A | 11/1997 | Moskowitz et al. | |
| 5,689,623 A | 11/1997 | Pinard | |
| 5,696,594 A | 12/1997 | Saito et al. | |
| 5,721,788 A | 2/1998 | Powell et al. | |
| 5,722,693 A * | 3/1998 | Wicker | 283/67 |
| 5,748,763 A | 5/1998 | Rhoads | |
| 5,760,386 A | 6/1998 | Ward | |
| 5,787,186 A | 7/1998 | Schroeder | |
| 5,788,285 A | 8/1998 | Wicker | |
| 5,790,693 A | 8/1998 | Graves et al. | |
| 5,790,703 A | 8/1998 | Wang | |
| 5,809,139 A | 9/1998 | Girod et al. | |
| 5,822,436 A | 10/1998 | Rhoads | |
| 5,825,892 A | 10/1998 | Braudaway et al. | |
| 5,832,186 A | 11/1998 | Kawana | |
| 5,862,218 A | 1/1999 | Steinberg | |
| 5,862,260 A | 1/1999 | Rhoads | |
| 5,875,249 A | 2/1999 | Mintzer et al. | |
| 5,893,101 A | 4/1999 | Balogh et al. | |
| 5,905,800 A | 5/1999 | Moskowitz et al. | |
| 5,905,819 A | 5/1999 | Daly | |
| 5,915,027 A | 6/1999 | Cox et al. | |
| 5,919,730 A | 7/1999 | Gasper et al. | |
| 5,930,369 A | 7/1999 | Cox et al. | |
| 5,933,798 A | 8/1999 | Linnartz | |
| 5,946,414 A | 8/1999 | Cass et al. | |
| 5,951,055 A | 9/1999 | Mowry, Jr. | |
| 5,960,081 A | 9/1999 | Vynne et al. | |
| 5,960,103 A | 9/1999 | Graves et al. | |
| 5,974,548 A | 10/1999 | Adams | |
| 5,978,013 A | 11/1999 | Jones et al. | |
| 6,045,656 A | 4/2000 | Foster et al. | |
| 6,046,808 A | 4/2000 | Fateley | |
| 6,054,021 A | 4/2000 | Kurrle et al. | |
| 6,094,483 A | 7/2000 | Fridrich et al. | |
| 6,104,812 A | 8/2000 | Koltai et al. | |
| 6,115,494 A | 9/2000 | Sonoda et al. | |
| 6,120,882 A | 9/2000 | Faykish et al. | |
| 6,122,403 A | 9/2000 | Rhoads | |
| 6,128,411 A | 10/2000 | Knox | |
| 6,136,752 A | 10/2000 | Paz-Pujalt et al. | |
| 6,183,018 B1 | 2/2001 | Braun | |
| 6,185,312 B1 | 2/2001 | Nakamura et al. | |
| 6,185,683 B1 | 2/2001 | Ginter et al. | |
| 6,192,138 B1 | 2/2001 | Yamadaji | |
| 6,201,879 B1 | 3/2001 | Bender et al. | |
| 6,233,347 B1 | 5/2001 | Chen et al. | |
| 6,233,684 B1 | 5/2001 | Stefik et al. | |
| 6,234,537 B1 | 5/2001 | Gurmann et al. | |
| 6,246,777 B1 | 6/2001 | Agarwal et al. | |
| 6,263,438 B1 | 7/2001 | Walker et al. | |
| 6,272,176 B1 | 8/2001 | Srinivasan | |
| 6,272,248 B1 | 8/2001 | Saitoh et al. | |
| 6,272,634 B1 | 8/2001 | Tewfik et al. | |
| 6,281,165 B1 | 8/2001 | Cranford | |
| 6,285,776 B1 | 9/2001 | Rhoads | |
| 6,304,345 B1 | 10/2001 | Patton et al. | |
| 6,314,192 B1 | 11/2001 | Chen et al. | |
| 6,320,675 B1 | 11/2001 | Sakaki et al. | |
| 6,328,209 B1 * | 12/2001 | O'Boyle | 235/380 |
| 6,332,031 B1 | 12/2001 | Rhoads et al. | |
| 6,332,194 B1 | 12/2001 | Bloom et al. | |
| 6,334,187 B1 | 12/2001 | Kadono | |
| 6,345,104 B1 | 2/2002 | Rhoads | |
| 6,356,363 B1 | 3/2002 | Cooper et al. | |
| 6,373,965 B1 | 4/2002 | Liang | |
| 6,390,362 B1 | 5/2002 | Martin | |
| 6,394,358 B1 | 5/2002 | Thaxton et al. | |
| 6,404,926 B1 | 6/2002 | Miyahara et al. | |
| 6,438,251 B1 | 8/2002 | Yamaguchi | |
| 6,471,247 B1 * | 10/2002 | Hardwick et al. | 283/72 |
| 6,481,753 B2 | 11/2002 | Van Boom et al. | |
| 6,590,996 B1 | 7/2003 | Reed et al. | |
| 6,591,009 B1 | 7/2003 | Usami et al. | |
| 6,614,914 B1 | 9/2003 | Rhoads et al. | |
| 6,636,615 B1 | 10/2003 | Rhoads et al. | |
| 6,718,046 B2 | 4/2004 | Reed et al. | |
| 6,751,342 B2 | 6/2004 | Shepard | |
| 6,755,441 B2 | 6/2004 | Stenzel et al. | |
| 6,763,122 B1 | 7/2004 | Rodriguez et al. | |
| 6,786,954 B1 * | 9/2004 | Lee et al. | 106/31.13 |
| 6,817,530 B2 * | 11/2004 | Labrec et al. | 235/487 |
| 6,827,277 B2 | 12/2004 | Bloomberg et al. | |
| 6,834,344 B1 | 12/2004 | Aggarwal et al. | |
| 6,934,344 B2 | 8/2005 | Kazakevich et al. | |
| 6,996,252 B2 | 2/2006 | Reed et al. | |
| 7,040,663 B1 | 5/2006 | Plaschka et al. | |
| 7,054,461 B2 | 5/2006 | Zeller et al. | |
| 7,143,950 B2 | 12/2006 | Jones et al. | |
| 7,194,105 B2 * | 3/2007 | Hersch et al. | 382/100 |
| 7,201,948 B2 | 4/2007 | Moia et al. | |
| 7,213,757 B2 | 5/2007 | Jones et al. | |
| 7,383,999 B2 | 6/2008 | Bi et al. | |
| 7,389,939 B2 | 6/2008 | Jones et al. | |
| 2001/0014169 A1 | 8/2001 | Liang | |
| 2001/0021144 A1 | 9/2001 | Oshima et al. | |
| 2001/0024510 A1 | 9/2001 | Iwamura | |
| 2001/0026377 A1 | 10/2001 | Ikegami | |
| 2001/0028727 A1 | 10/2001 | Naito et al. | |
| 2001/0030759 A1 | 10/2001 | Hayashi et al. | |
| 2001/0030761 A1 | 10/2001 | Ideyahma | |
| 2001/0033674 A1 | 10/2001 | Chen et al. | |
| 2001/0037313 A1 | 11/2001 | Lofgren et al. | |
| 2001/0037455 A1 | 11/2001 | Lawandy et al. | |
| 2001/0040980 A1 | 11/2001 | Yamaguchi | |
| 2001/0052076 A1 | 12/2001 | Kadono | |
| 2001/0053235 A1 | 12/2001 | Sato | |
| 2001/0054644 A1 | 12/2001 | Liang | |
| 2002/0015509 A1 | 2/2002 | Nakamura et al. | |
| 2002/0018879 A1 | 2/2002 | Barnhart et al. | |
| 2002/0021824 A1 | 2/2002 | Reed et al. | |
| 2002/0023218 A1 | 2/2002 | Lawandy et al. | |
| 2002/0027612 A1 | 3/2002 | Brill et al. | |
| 2002/0027674 A1 | 3/2002 | Tokunaga et al. | |
| 2002/0031241 A1 | 3/2002 | Kawaguchi et al. | |
| 2002/0040433 A1 | 4/2002 | Kondo | |
| 2002/0054692 A1 | 5/2002 | Suzuki et al. | |
| 2002/0057431 A1 | 5/2002 | Fateley et al. | |
| 2002/0067844 A1 | 6/2002 | Reed et al. | |
| 2002/0073317 A1 | 6/2002 | Hars | |
| 2002/0080396 A1 | 6/2002 | Silverbrook et al. | |
| 2002/0080959 A1 | 6/2002 | Wellner | |
| 2002/0099943 A1 | 7/2002 | Rodriguez et al. | |

| | | | |
|---|---|---|---|
| 2002/0118394 | A1 | 8/2002 | McKinley et al. |
| 2002/0163633 | A1 | 11/2002 | Cohen |
| 2002/0171853 | A1 | 11/2002 | Wu |
| 2002/0176600 | A1 | 11/2002 | Rhoads et al. |
| 2002/0180995 | A1 | 12/2002 | Yen et al. |
| 2003/0005304 | A1 | 1/2003 | Lawandy et al. |
| 2003/0012562 | A1 | 1/2003 | Lawandy et al. |
| 2003/0032033 | A1 | 2/2003 | Anglin et al. |
| 2003/0056104 | A1 | 3/2003 | Carr et al. |
| 2003/0156733 | A1 | 8/2003 | Zeller et al. |
| 2004/0000787 | A1 | 1/2004 | Vig et al. |
| 2004/0075869 | A1 | 4/2004 | Hilton et al. |
| 2004/0233465 | A1 | 11/2004 | Coyle et al. |
| 2004/0263911 | A1 | 12/2004 | Rodriguez et al. |
| 2005/0041835 | A1 | 2/2005 | Reed et al. |
| 2007/0246543 | A1 | 10/2007 | Jones et al. |

FOREIGN PATENT DOCUMENTS

| | | |
|---|---|---|
| EP | 590884 | 4/1994 |
| EP | 642060 | 3/1995 |
| EP | 705022 | 4/1996 |
| EP | 991047 | 4/2000 |
| EP | 1077570 | 2/2001 |
| EP | 1137244 | 9/2001 |
| EP | 1152592 | 11/2001 |
| EP | 1173001 | 1/2002 |
| EP | 1209897 | 5/2002 |
| GB | 1534403 | 12/1978 |
| GB | 2360659 | 9/2001 |
| JP | 7093567 | 4/1995 |
| JP | 7108786 | 4/1995 |
| JP | 11-245473 | 9/1999 |
| WO | WO95/13597 | 5/1995 |
| WO | WO96/03286 | 2/1996 |
| WO | WO9936876 | 7/1999 |
| WO | WO01/05075 | 1/2001 |
| WO | WO01/08405 | 2/2001 |
| WO | WO01/39121 | 5/2001 |
| WO | WO01/72030 | 9/2001 |
| WO | WO01/73997 | 10/2001 |
| WO | WO01/97128 | 12/2001 |
| WO | WO01/97175 | 12/2001 |
| WO | WO02/19269 | 3/2002 |
| WO | WO02/21846 | 3/2002 |
| WO | WO02/23481 | 3/2002 |
| WO | WO01/88883 | 11/2002 |
| WO | WO2004051917 | 6/2004 |

OTHER PUBLICATIONS

U.S. Appl. No. 09/619,264, Kumar, filed Jul. 19, 2000.
U.S. Appl. No. 09/562,516, Rodriguez et al., filed May 1, 2000.
U.S. Appl. No. 60/082,228, Rhoads, filed Apr. 16, 1998.
U.S. Appl. No. 60/323,148, Davis et al., filed Sep. 17, 2001.
Alattar, "'Smart Images' Using Digimarc's Watermarking Technology," IS&T/SPIE's 12.sup.th Int. Symposium on Electronic Imaging, San Jose, CA, Jan. 25, 2000, vol. 3971, No. 25, 10 pages.
Battialo et al., "Robust Watermarking for Images Based on Color Manipulation," IH/99 LNCS 1768, pp. 302-317, 2000.
Bender et al., "Applications for Data Hiding," IBM Systems Journal, vol. 39, Nos. 3&4, 2000, pp. 547-568.
Bors et al., "Image Watermarking Using DCT Domain Constraints," Proc. Int. Conf. on Image Processing, vol. 3, pp. 231-234.
Brownell, "Counterfeiters Dye Over Security Measures," SPIE's OE Magazine, Sep. 2001, pp. 8-9.
Fleet et al., "Embedding Invisible Information in Color Images," Proc. Int. Conf. on Image Processing, vol. 1, pp. 532-535, Oct. 1997.
Frequently Asked Questions About Digimarc Signature Technology, Aug. 1, 1995, HTTP://WWW.DIGIMARC.COM, 9 pages.
"Holographic signatures for digital images," The Seybold Report on Desktop Publishing, Aug. 1995, one page.
Hunt, "The Reproduction of Colour in Photography, Printing & Television,"1987, pp. 588, 589 and Plate 35 (in color).
Kohda et al., "Digital Watermarking Through CDMA Channels Using Spread Spectrum Techniques," 2000 IEEE, pp. 671-674.
Komatsu et al., "A Proposal on Digital Watermark in Document Image Communication and Its Application to Realizing a Signature," Electronics and Communications in Japan, Part 1, vol. 73, No. 5, 1990, pp. 22-33.
Komatsu et al., "Authentication System Using Concealed Image in Telematics," Memoirs of the School of Science & Engineering, Waseda Univ., No. 52, 1988, pp. 45-60.
ORuanaidh et al, "Watermarking Digital Images for Copyright Protection," http://www.kalman.mee.tcd.ie/people/jjr/eva.sub.-pap.html, Feb. 2, 1996, 8 pages.
Piva et al., "Exploiting the Cross-Correlation of RGB-Channels for Robust Watermarking of Color Images," 1999 IEEE, pp. 306-310.
Kutter et al., "Digital Signature of Color Images Using Amplitude Modulation," SPIE vol. 3022, 1997, pp. 518-526.
Vidal et al., "Non-Noticeable Information Embedding in Color Images: Marking and Detection," IEEE (1999), pp. 293-297.
Wang et al., "Embedding Digital Watermarks in Halftone Screens," Security and Watermaking of Multimedia Contents II, Proc. of SPIE vol. 3971 (2000), pp. 218-227.
Jan. 5, 2007 Notice of Allowance (including an Interview Summary); Dec. 12, 2006 Amendment and Terminal Disclaimer; and Dec. 1, 2006 non-final Office Action, each from assignee's U.S. Appl. No. 10/941,059 (now US Patent No. 7,213,757).
Mar. 17, 2008 Notice of Allowance; Jan. 1, 2008 Amendment and Terminal Disclaimer; and Sep. 25, 2007 non-final Office Action, each from assignee's U.S. Appl. No. 11/745,909 (published as US 2007-0246543 A1).
Apr. 9, 2008 non-final Office Action; Jan. 9, 2008 Preliminary Amendment and Election; and Dec. 10, 2007 Restriction Requirement, each from assignee's U.S. Appl. No. 10/836,094 (published as US 2005-0041835 A1).
Jun. 6, 2008 non-final Office Action; Jan. 28, 2008 Amendment; and Jun. 12, 2007 Office Action; all from assignee's U.S. Appl. No. 10/723,181 (published as US 2004-0263911 A1).
Mar. 23, 2004 International Search Report from assignee's PCT application No. PCT/US03/37802 (published as WO 2004051917).
Jul. 8, 2008 Notice of Reasons for Rejection from assignee's Japanese Application No. P2004-570949 (based on PCT application No. PCT/US03/37802).
Oct. 6, 2008 Amendment in assignee's U.S. Appl. No. 10/723,181 (published as US 2004-0263911 A1).
Aug. 7, 2008 Amendment, and Apr. 9, 2008 non-final Office Action (including list of references cited by examiner) in assignee's U.S. Appl. No. 10/836,094 (published as US 2005-0041835 A1).
Chun-Hsien et al., "Embedding Color Watermarks in Color Images," Multimedia Signal Processing, 2001 IEEE, pp. 327-332.

* cited by examiner

| 1 | 1 | 1 | 0 | 1 | 0 | 0 |
| 1 | 0 | 1 | 0 | 0 | 1 | 1 |
| 0 | 1 | 1 | 0 | 0 | 1 | 0 |
| 0 | 1 | 0 | 1 | 1 | 1 | 0 |
| 1 | 0 | 1 | 1 | 0 | 0 | 1 |

FIG. 6b

MACHINE-READABLE SECURITY FEATURES FOR PRINTED OBJECTS

RELATED APPLICATION DATA

This application claims the benefit of U.S. Provisional Patent Application No. 60/523,159, filed Nov. 17, 2003. This application is a continuation in part of U.S. patent application Ser. No. 10/836,094, filed on Apr. 29, 2004, which claims the benefit of U.S. Provisional Patent Application Nos. 60/466, 926, filed Apr. 30, 2003. This application is also a continuation in part of U.S. patent application Ser. No. 10/818,938, filed Apr. 5, 2004, which is a continuation of U.S. patent application Ser. No. 09/945,243, filed Aug. 31, 2001 (now U.S. Pat. No. 6,718,046). This application is also a continuation in part of U.S. patent application Ser. No. 10/723,181, filed Nov. 26, 2003, which claims the benefit of U.S. Provisional Patent Application Nos. 60/430,014, filed Nov. 28, 2002, 60/466,926, filed Apr. 30, 2003, and 60/475,389, filed Jun. 2, 2003. Each of these patent documents is herein incorporated by reference.

FIELD OF THE INVENTION

The present invention relates to security features for objects like product packaging, banknotes, checks, labels and identification documents.

BACKGROUND AND SUMMARY OF THE INVENTION

The present invention provides features to aid in the security or authentication of printed objects. We have found that a security feature is enhanced when it involves a multi-dimensional solution. To illustrate, we variously combine the principles of time, space and frequency when crafting such a multi-dimensional security feature. Multi-dimensional security features are readily applied to printed objects such as banknotes, checks, labels, product packaging, and identification documents.

For the purposes of this disclosure, identification documents are broadly defined and may include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments or documentation, security clearance badges and cards, gun permits, gift certificates or cards, labels or product packaging, membership cards or badges, etc., etc. Also, the terms "document," "card," and "documentation" are used interchangeably throughout this patent document. Identification documents are also sometimes referred to as "ID documents."

Identification documents can include information such as a photographic image, a bar code (e.g., which may contain information specific to the person whose image appears in the photographic image, and/or information that is the same from ID document to ID document), variable personal information (e.g., such as an address, signature, and/or birth date, biometric information associated with the person whose image appears in the photographic image, e.g., a fingerprint), a magnetic stripe (which, for example, can be on the a side of the ID document that is opposite a side with a photographic image), and various designs (e.g., a security pattern like a printed pattern comprising a tightly printed pattern of finely divided printed and unprinted areas in close proximity to each other, such as a fine-line printed security pattern as is used in the printing of banknote paper, stock certificates, and the like). Of course, an identification document can include more or less of these types of features.

One exemplary ID document comprises a core layer (which can be pre-printed), such as a light-colored, opaque material, e.g., TESLIN, which is available from PPG Industries) or polyvinyl chloride (PVC) material. The core can be laminated with a transparent material, such as clear PVC to form a so-called "card blank". Information, such as variable personal information (e.g., photographic information, address, name, document number, etc.), is printed on the card blank using a method such as Dye Diffusion Thermal Transfer ("D2T2") printing (e.g., as described in commonly assigned U.S. Pat. No. 6,066,594, which is herein incorporated by reference), laser or inkjet printing, offset printing, etc. The information can, for example, comprise an indicium or indicia, such as the invariant or nonvarying information common to a large number of identification documents, for example the name and logo of the organization issuing the documents.

To protect the information that is printed, an additional layer of transparent overlaminate can be coupled to the card blank and printed information, as is known by those skilled in the art. Illustrative examples of usable materials for overlaminates include biaxially oriented polyester or other optically clear durable plastic film.

Figure 1:
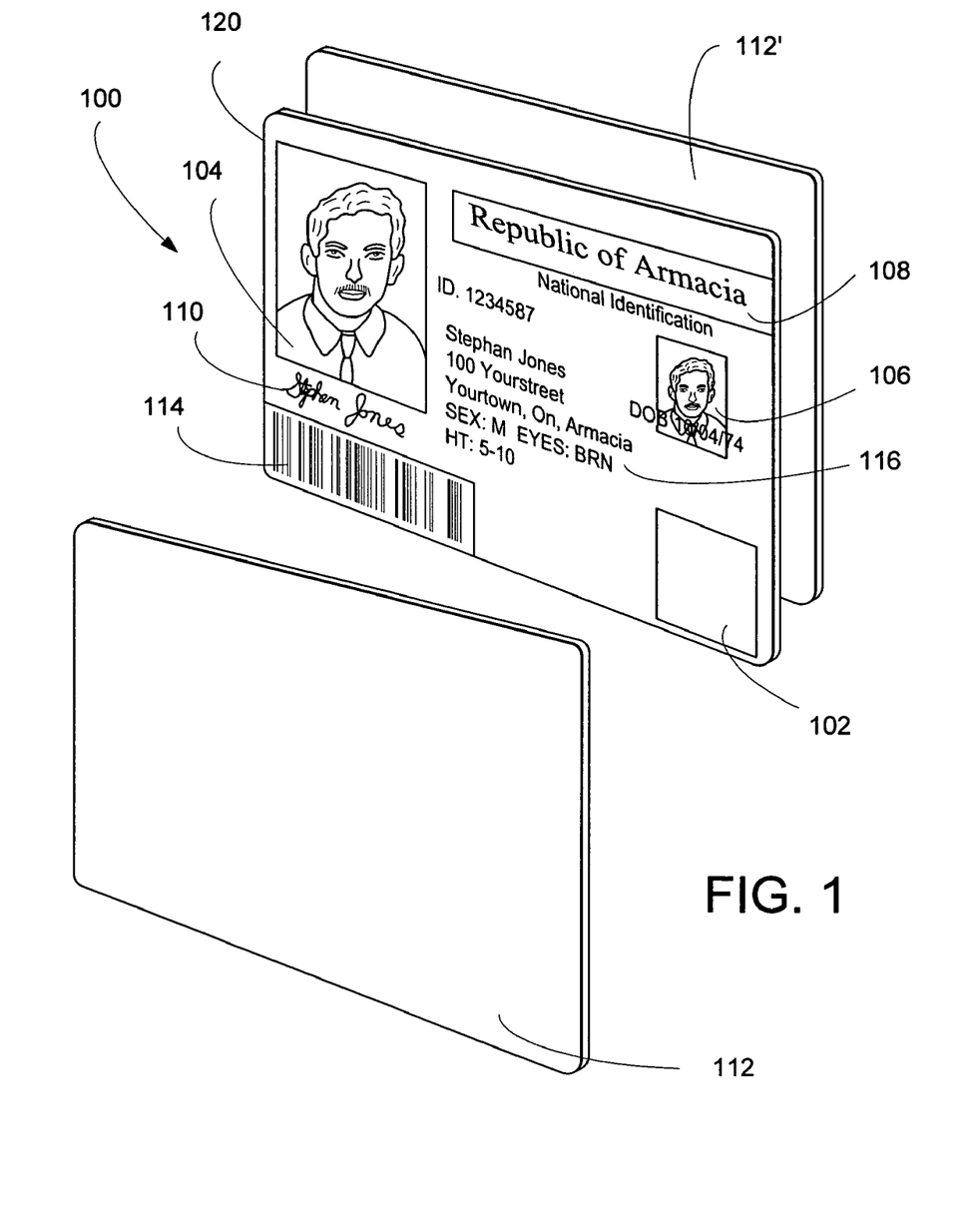
FIG. 1 illustrates an identification document.

One type of identification document 100 is illustrated with reference to FIG. 1. The identification document 100 includes a machine-readable (e.g., digital watermark) security feature 102. The security feature 102 can be printed or otherwise provided on a substrate/core 120 or perhaps on a protective or decorative overlaminate 112 or 112'. The security feature 102 need not be provided on the "front" of the identification document 100 as illustrated, but can alternatively be provided on a backside of the identification document 100. The identification document 100 optionally includes a variety of other features like a photograph 104, ghost or faint image 106, signature 108, fixed information 110 (e.g., information which is generally the same from ID document to ID document), other machine-readable information (e.g., bar codes, 2D bar codes, optical memory) 114, variable information (e.g., information which generally varies from document to document, like bearer's name, address, document number) 116, etc. The document 100 may also include overprinting (e.g., DOB over image 106), microprinting (not shown), artwork, background patterns or tints, graphics, seals, etc. (all not shown). In some implementations security feature 102 overlaps or is embedded in at least one of the photograph, ghost image, artwork, background, graphics seals, etc.

Of course, there are many other physical structures/materials and other features that can be suitably interchanged for use with the identification documents described herein. The inventive techniques disclosed in this patent document will similarly benefit these other documents as well.

According to one aspect of the present invention, a printed document includes a machine-readable signal. The signal includes: a first set of print structures conveyed with first ink, and a second set of print structures convey with optical variable ink. The second set of print structure are provided to cooperate with the first set of print structures so that at a first observation angle the first set of print structures and the second set of print structures appear to provide uninterrupted print structures, and at a second observation angle the second set of print structures appear less observable to yield interrupted print structures. In some implementations the first set of print structures and the second set of print structures are lines or line segments.

Another aspect of the present invention is a printed document. The document includes a first set of elements provided on a surface of the printed document via first ink. The first ink has characteristics which require observation at a first angle and which are less observable at a second angle. The document further includes a second set of elements provided on the surface of the printed object via second ink. The second ink has a first emission decay rate and the second ink must be excited in a range of non-visible light in order to produce emissions. The first set of elements and the second set of elements cooperate to convey a machine-readable signal. The machine-readable signal is only observable at the first observation angle upon excitation in the range of non-visible light.

Still another aspect of the present invention is a printed document including a digital watermark printed thereon. The printed document has a property so that in response to an observation of the digital watermark, the digital watermark is altered to evidence the observation.

The foregoing and other features, aspects and advantages of the present invention will be even more readily apparent from the following detailed description, which proceeds with reference to the accompanying drawings.

DETAILED DESCRIPTION

In some secure implementations a security feature (e.g., feature 102 in FIG. 1) is enhanced when it includes a multi-dimensional solution. A preferred multi-dimensional solution includes a combination of time, frequency and/or space components.

Figure 2A:
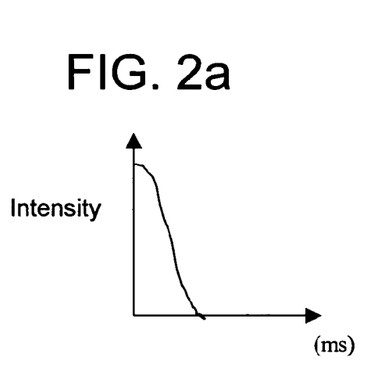
FIG. 2a is a graph showing a relatively short fluorescence decay time.
Figure 2B:
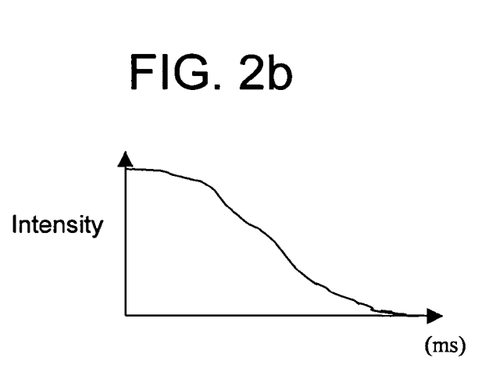
FIG. 2b is a graph showing a relatively longer fluorescence decay time.

Time. We view our time component broadly. This component provides a period during which an action, process or condition must reveal itself or must be detected for a security feature to be authenticated or valid. For example, inks and dyes have emerged with unique fluorescing (or emission) properties. Some of these properties include variable fluorescence or emission decay times. For example, first ink may include a relatively short decay time (FIG. 2a) in comparison to second ink having a relatively longer decay time (FIG. 2b). Typical decay times can vary from less than a microsecond to several seconds and more. An optical sensor (e.g., CCD scanner) and microprocessor are used to measure decay emissions from such inks and dyes. Other optical capture devices (cameras, digital cameras, optically filtered receptors (e.g., to pick up IR or UV) web cameras, etc.) can be suitably interchanged with a CCD scanner. The measured decay emissions are compared to an expected emission decay time to determine authenticity, or an expected decay time is used to establish a detection window corresponding to an ink's decay rate. Exemplary inks and fluorescing materials are available, e.g., from PhotoSecure in Boston, Mass., USA, such as those sold under the trade name SmartDYE™. Other cross-spectrum inks (e.g., inks which, in response to illumination in one spectrum, activate, transmit or emit in another spectrum) are available, e.g., from Gans Ink and Supply Company in Los Angeles, Calif., USA. Of course other ink or material evidencing the above or similar emission properties can be suitably interchanged herewith.

Frequency. Frequency may dictate a frequency of light needed to activate or excite a material or ink. Frequency may also indicate a color or spectrum of a material's resulting fluorescence or emissions. For example, the above decaying inks are typically excited with ultraviolet (UV) light or infrared (IR) light and emit in the UV, IR or visible spectrums. Ink can be excited with UV light and fluoresce a visible color (or become visible) in the visible spectrum. Different ink can be excited with UV or IR light and fluoresce (or emit) in the UV or IR spectrums. (These inks are generally invisible when illuminated with visible light, which makes them ideally suited for covert applications such as copy control or counterfeit detection.) Frequency can also signify emission characteristics, such as emissions in a particular frequency band, which allows for frequency-based detection, or emitting only after being activated by illumination within a particular frequency band. Such inks can be packaged for printing using conventional printing techniques, like dye diffusion thermal transfer (D2T2), thermal transfer, offset printing, lithography, flexography, silk screening, mass-transfer, laser xerography, ink jet, wax transfer, variable dot transfer, and other printing methods by which a fluorescing or emitting pattern can be formed.

Space. Our space component is also viewed broadly, and may include a positional angle needed to illuminate and/or observe a security feature. By way of example only, so-called optical variable ink (or OVI) may include tiny flakes or metal platelets, which change color or reflect light differently, as an observation angle or illumination angle is varied. OVI printing appears and disappears depending on-the angle of viewing and cannot be photocopied, since the variation in color or light is due to the flakes or platelets. A check or banknote including an OVI feature (e.g., printed via a silk screen process) must be viewed at an angle corresponding to the OVI material in order to perceive the OVI feature.

Below we discuss various security features including time, frequency and/or spatial components.

Figure 3A:
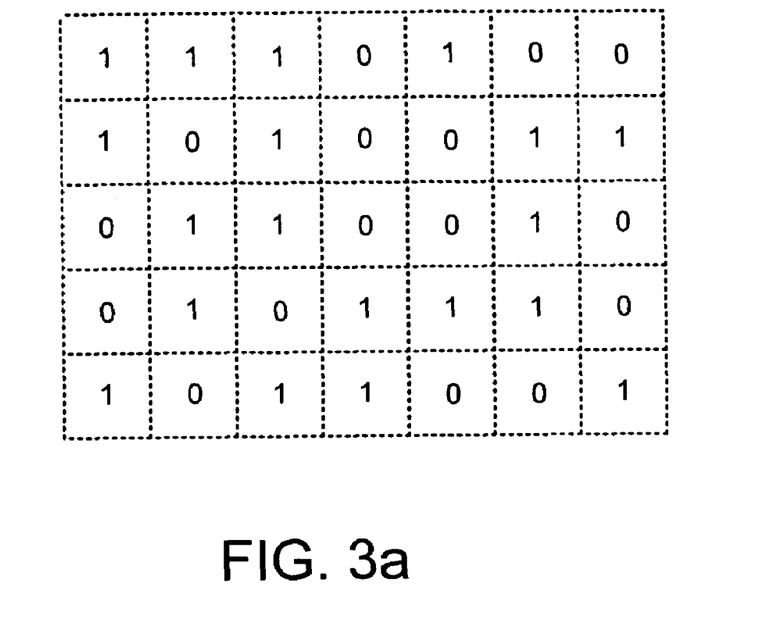
FIG. 3a represents a binary form of an auxiliary signal.
Figure 3B:
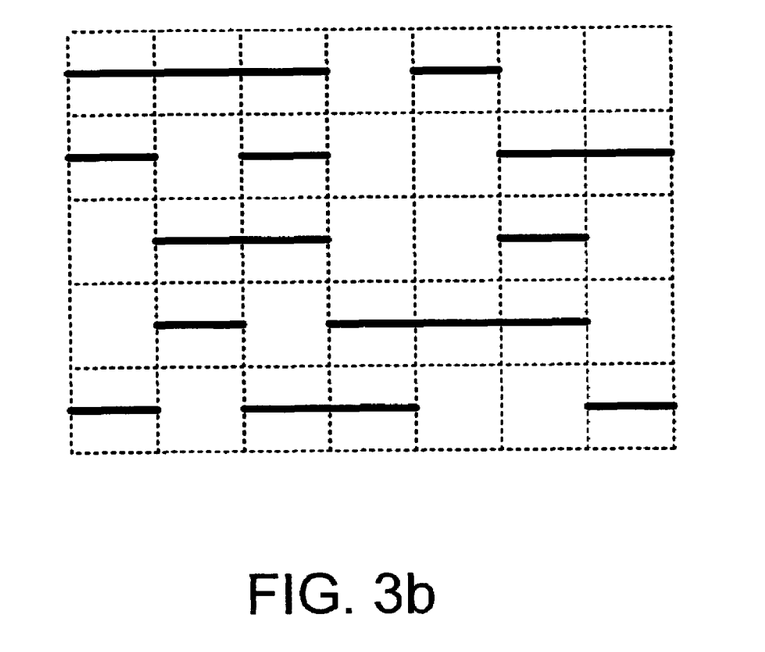
FIG. 3b is a diagram illustrating how the auxiliary signal of FIG. 3a can be mapped to different types of print structures, such as line structures, to embed the auxiliary signal into a printed image.

The line structure shown in FIG. 3b is sometimes referred to as line continuity modulation (LCM) because an auxiliary signal (FIG. 3a) is carried in an image of lines by varying the continuity of the lines. For example, the auxiliary signal is embedded in the line image by selectively breaking lines where the corresponding embedding location value is zero. The FIG. 3b. LCM structures correspond to a binary representation of an auxiliary signal in FIG. 3a. One way to create this auxiliary signal is to use a digital watermark generation process. (One such process embeds a digital watermark into a block of midlevel gray values, thresholds the result to binary values per embedding location, and then inserts the desired print structure and property (e.g., line structure, screen, color, etc.) per embedding location based on the auxiliary signal value at that location.) Optical scan data representing the LCM structures is captured. From the scan data, the lines, relative to the breaks, are analyzed to recover the auxiliary signal.

An improvement is to convey an LCM watermark signal using various combinations of time, frequency and spatial components.

Figure 4A:
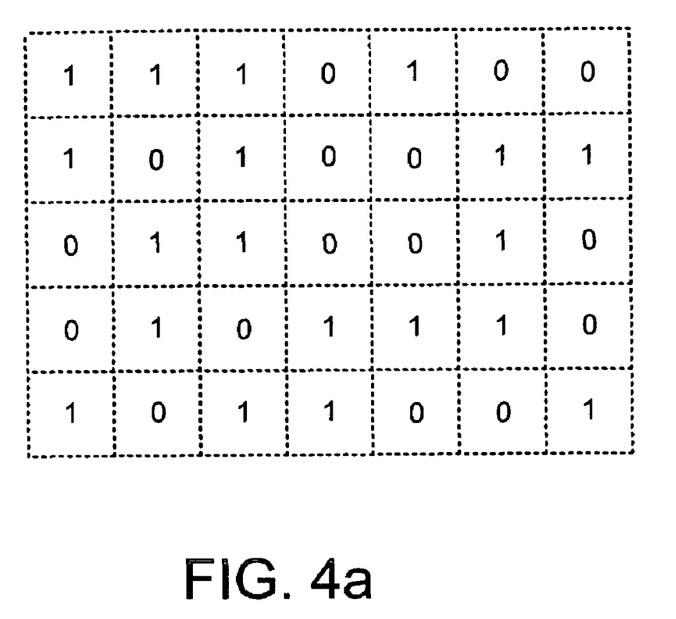
FIG. 4a illustrates a binary form of an auxiliary signal.
Figure 4B:
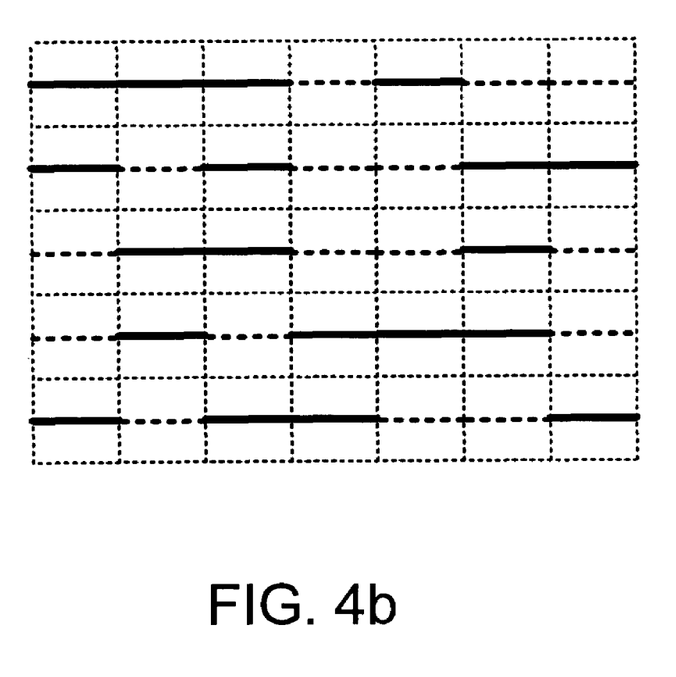
FIGS. 4b-4d illustrate use of a space component to enhance a line continuity modulation watermark.
Figure 4C:
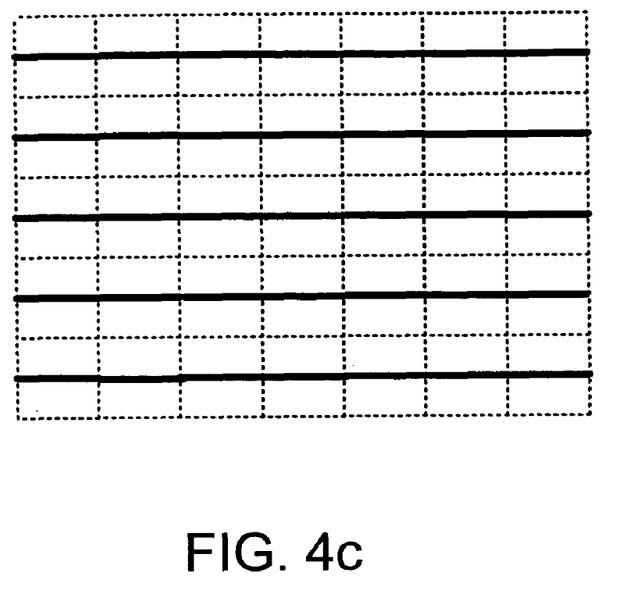
Figure 4D:
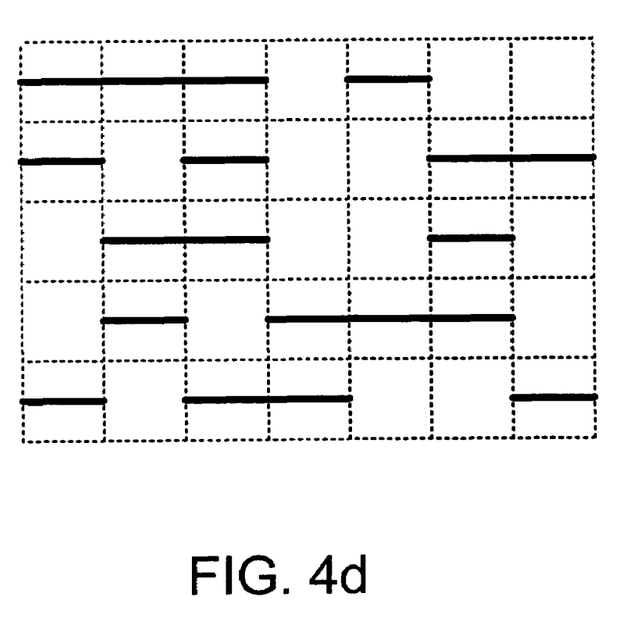

In a first implementation, we use a space component advantageously to enhance an LCM watermark. A binary representation of an auxiliary signal is provided, e.g., as shown in FIG. 4a. Two inks convey the FIG. 4a signal in LCM fashion, but with standard (e.g., conventional) ink representing binary ones (represented by solid lines in FIG. 4b) and optical variable ink (OVI) ink representing binary zeros (represented by the dashed lines in FIG. 4b). The OVI ink is selected to match or approximate the color or contrast of the standard ink. Thus, when viewed at a first angle, the LCM structures appear as solid lines (FIG. 4c)—concealing the auxiliary signal. However, when viewed at a second (different) angle, the LCM structures appear to include breaks (FIG. 4d) or different colors—revealing the auxiliary signal for machine-detection. The segmentation results since the OVI changes color (or appears to disappear) at the second viewing angle. If the OVI ink changes color at the second viewing angle, color contrast can be emphasized with a filter or selected illumination, e.g., as even further discussed in assignee's U.S. Provisional Patent Application No. 10/836,094, filed Apr. 29, 2004. (It should be appreciated that we can similarly represent zeros with standard ink, and the ones with the OVI ink.).

Figure 5A:
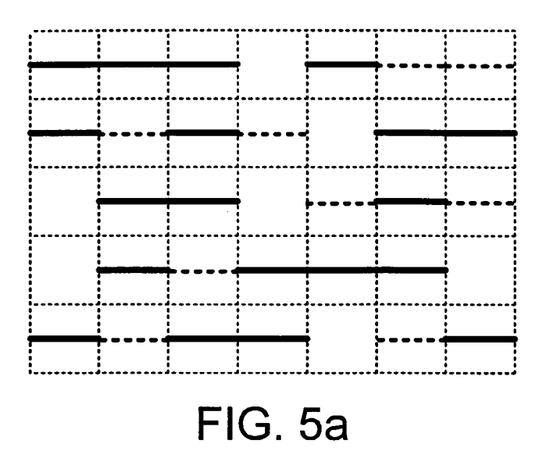
FIGS. 5a-5c illustrate a conveyance of different auxiliary signals through appropriate use of a frequency component.
Figure 5B:
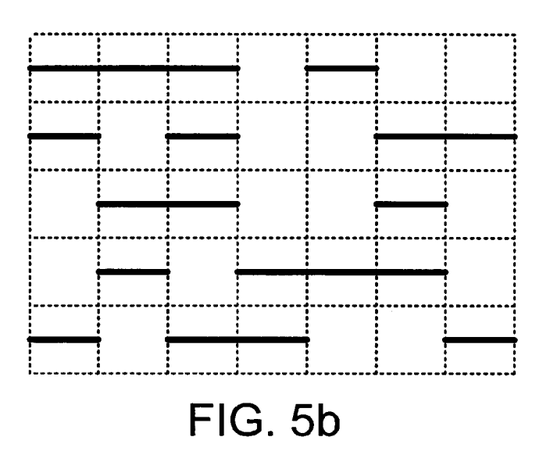
Figure 5C:
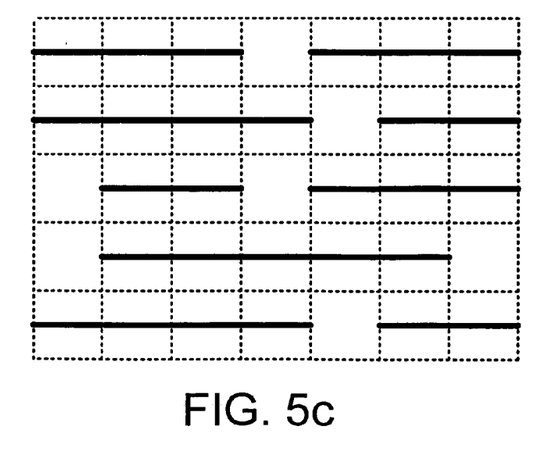

In a second implementation, at least some of the line segments (representing binary ones) are conveyed with a fluorescing ink (hereafter referred to as "fluorescing ones"). The line segments representing some of the fluorescing ones become detectable with appropriate UV or IR illumination, but remain unnoticeable without appropriate UV or IR stimulation. FIG. 5a shows an LCM watermark with dashed lines representing fluorescing ones. The dashed lines are not detectable absent excitation in an appropriate frequency band (e.g., the dashed lines only fluoresce when exposed to UV or IR light). We imagine a case where, without appropriate UV or IR illumination, the LCM watermark conveys a first auxiliary signal (e.g., FIG. 5b which conveys the first signal by not including the dormant dashed lines), but the LCM watermark provides a second auxiliary signal (e.g., FIG. 5c) when the fluorescing ones are activated with UV or IR light. The first signal can be used as a "public" signal, while the second signal is a "private" signal. The public signal may be accessible to the public generally (e.g., through visible light scanning and publicly available detection software), while the private signal is available only with appropriate UV scanning and/or detection. The public signal may even announce the expected presence of the private signal. (This announcement may be secret, e.g., only after the public signal is processed according to a private cryptographic key.) The ink decay rate can be optionally measured as a further security clue, or can be strobed and measured within a detection window corresponding to the decay rates (e.g., providing a "time" component).

In a third implementation, a first portion of binary ones are represented by line segments laid down with OVI ink and a second portion of the binary ones are represented by line segments laid down with UV or IR activated, time decaying ink ("fluorescing ones"). Thus, the LCM watermark is only detectable with appropriate illumination (e.g., at a particular frequency to excite the fluorescing ones), within a particular decaying window (e.g., only detectable for a predetermined time after steady state illumination) and at an appropriate angle (e.g., at spatial angle corresponding to the OVI ink ones). As discussed with the second LCM implementation above, a first signal may be obtained through visible light scanning and at a first angle, a second signal may be obtained through visible light scanning at a second angle, a third signal may be obtained with appropriate UV or IR illumination and at a predetermined angle, and so on to leverage the time, space and frequency properties. A variation of this third implementation provides OVI ink with time-decaying (and perhaps limited-band illumination) fluorescing properties. That is, OVI ink must be illuminated within a particular band of UV/IR light for activation in a particular light band (e.g., visible or limited UV or IR band) and where the emissions decay at a predetermined rate (perhaps emitting at a particular band). Thus, detection is limited to a particular time/frequency which is only observable at a predetermined angle (or between a narrow range of observation angles).

An advantage of OVI-Fluorescing watermarks is that a watermark is lost with photocopying. The photocopy will likely reproduce an image from the first viewing angle (FIG. 4c), which will result in solid lines from when the copy is viewed from both the first and second viewing angles. Another advantage is that a watermark remains undetectable unless viewed at an appropriate angle (spatial component), viewed with or shortly after appropriate illumination (frequency component) and/or viewed within an expected decay window (time component)

While we have illustrated multi-dimensional security features with respect to LCM watermarks, the present invention is not so limited. Other types of watermarking will benefit from our techniques as well. Consider, for example, line art watermarking techniques discussed in assignee's U.S. Pat. No. 6,567,534, which is herein incorporated by reference. We can provide fluorescing ink or OVI ink so that luminance attributable to a particular area (or line art structure) is increased (or decreased) when viewed at a particular angle or when illuminated with appropriated UV or IR stimulus. Or if a watermarking technique is based on adjusting frequency domain coefficients or attributes, we can provide OVI or fluorescing ink to subtly alter image or background characteristics in manner to influence frequency domain coefficients or attributes. The influence is detectable only at a particular angle (OVI) or with appropriate illumination (fluorescing ink). Of course, our techniques can be applied to other types of watermarking and other machine-readable codes as well. To name a few, we can enhance 2D symbologies, glyphs, bar codes, etc. with our inventive techniques.

Alternatives and Applications

While we have described the present invention with respect to combinations of three components—time, frequency and space—the present invention is not so limited. There may be additional components as well. In some implementation we provide one or more OVI or fluorescing inks. For example, we provide two or more fluorescing inks as discussed in assignee's U.S. Published Patent Application No. U.S. 2002-0090112 A1. The two or more fluorescing inks have different decay times, which can be used to create limited detection windows. The two or more fluorescing inks can be combined with optical variable materials to add a spatial component as well. Or, in other implementations, we provide two or more different viewing angle OVI inks, along with one or more fluorescing inks. In addition to time, frequency and space, we can add other components such as heat (e.g., through thermochromatic inks or inks which change color or characteristics in response to heat or cold) and magnetic inks. A check or identification document can be printed to include a security feature that must be viewed at a particular angle (OVI ink), illuminated at particular UV or IR frequency (fluorescing ink), heated or cooled to a particular temperature (thermochromatic ink) and perhaps time-measure its emission decay rate (decaying ink) in order to validate the security feature.

Each of the components (or a subset of the components)—time, frequency, space, heat and magnetism—can be viewed as tumbles of a combination lock. If the tumbles do not align as expected, the combination lock remains locked. Each component can be varied to provide many different combinations. We envision that the selection of the tumbles (e.g., selection of viewing angle, illumination wavelength, decay time, temperature, etc.) can be pseudo-randomly selected. Once selected the tumbles are arranged on a check, banknote, identification document, etc. The corresponding combination is stored to be used to validate the check, banknote or identification document. Or, a detector can be programmed that for printed checks issued from a first bank, it expects a first combination, and for printed checks from second bank, it expects a second combination. A machine-readable code (perhaps encrypted) can be included on the check to evidence the expected combination. Still further, the expected combination can be stored in a data repository (either remote or local to a detector). The stored expected combination is retrieved to validate a printed document. Thus, even if a would-be counterfeiter knows that the combination involves time, frequency, space and/or heat tumbles, the counterfeiter will not know how the various tumbles interrelate.

Changing with Observation

Another inventive aspect of the present invention is a machine-readable security feature (e.g., steganographic encoding) that is designed to change with observation. That is, the very act of machine-reading the security feature changes the feature in some predetermined or recognizable manner.

Figure 6A:
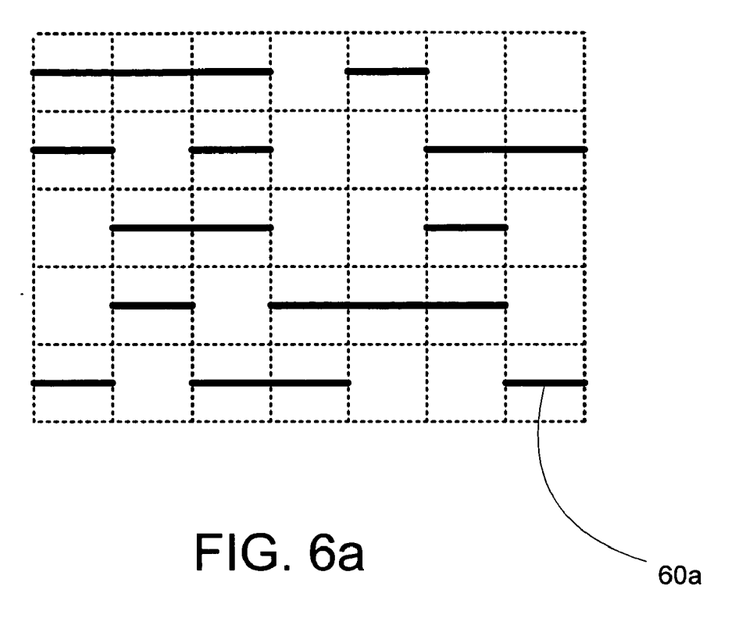
FIGS. 6a and 6b illustrate a machine-readable signal that changes with observation.
Figure 6B:
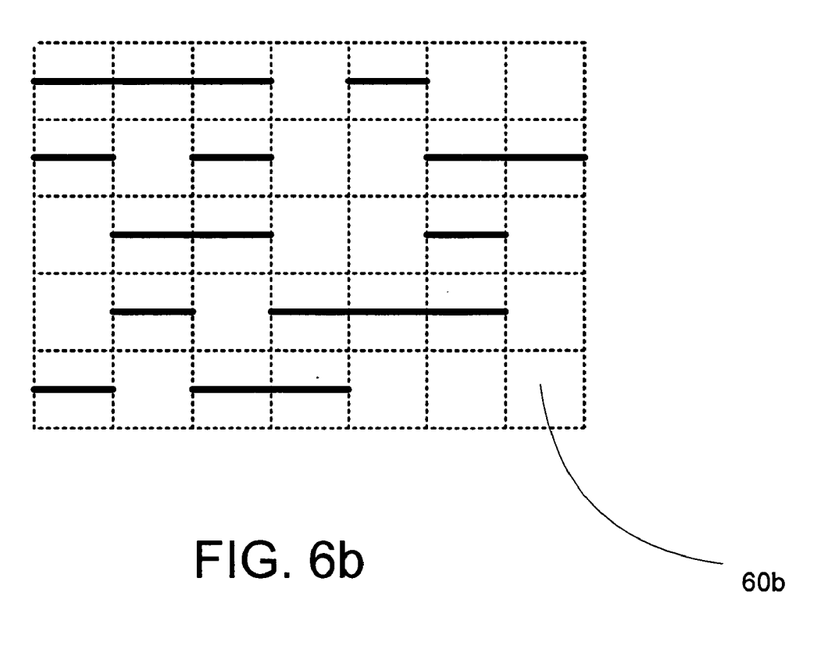

In a simple example, we lay down an LCM watermark as shown in FIG. 6a. FIG. 6a is illustrated as if under steady UV or IR illumination or shortly thereafter. That is because we prefer, in this implementation, to use ink that fluoresces when exposed to a predetermined wavelength (e.g., UV). The lines (e.g., representing binary ones) and the line breaks (e.g., representing binary zeros) become distinguishable with appropriate illumination. We provide a material that is photosensitive in a predetermined manner, whether it is akin to a photo-resist, photochromatic or photocuring process, the photosensitive material physically changes when exposed to the predetermined wavelength. (Examples of materials include photochromatic inks, known to those skilled in the art, which can be designed to experience a permanent change with appropriate stimulation. Suitable curing equipment is provided, e.g., by Fusion UV Systems, Inc. in Gaithersburg, Md., USA, among many others.) Preferably, the same light wavelength that excites the ink also cures or changes the material, e.g., darkens or crystallizes the material. (In other implementations a customized scanner used to read the machine-readable code includes a first light source to help read the code and a second, different light source to change the material.) The photosensitive material is provided, e.g., in cell 60a. Cell 60a includes a line segment conveyed with fluorescing ink. UV or IR illumination excites the fluorescing ink in cell 60a—allowing for a machine-read—but the illumination also cures or changes the material, e.g., lightens or darkens the material. The next time the LCM watermark is exposed to the wavelength, emissions from the line segment are not observable due to the changed material, e.g., cell 60b in FIG. 6b. In other embodiments the material changes so as to allow the reading a binary one.

The applications for such arrangements are many. For example, an optical sensor, scanner or photocopier is provided with an illumination source corresponding to the predetermined wavelength. The illumination source illuminates an object (e.g., a banknote) printed with fluorescing ink and including photosensitive material. The material cures—changing the watermark—with UV or IR stimulation. If the object is photocopied again, the changed watermark may be used to shut down the copy operation, to covertly alert authorities that a second copy operation is underway, or to simply evidence that the watermark has been previously detected.

In other implementations the photosensitive material is designed to gradually change with repeated exposure to UV or IR stimulation. For example, a first application of UV or IR stimulation changes the material to a first state (perhaps represented by a first contrast color), a second application of the UV or IR stimulation changes the material to a second state (perhaps represented by a second, darker contrast color) and a third exposure changes the material to a third state (again, represented by a third and still darker contrast color). The state of the material can be determined from optical scan data representing the material's contrast. An action (e.g., copy control, licensing generation, document lifespan determination, forensic monitoring, etc.) is carried out based on the material's state.

In still other implementations, we use a thermochromatic ink instead of a photosensitive (or microwave excited) material. The thermochromatic ink preferably permanently changes color when exposed to a predetermined temperature. The thermochromatic ink is arranged on a printed object (e.g., identification document) so that it will affect a machine-readable code upon activation. For example, if the machine-readable code is a LCM watermark, the thermochromatic ink can be arrange to provide one or more line segments (e.g., representing one or more binary ones) when activated. Or, if the machine-readable code is a background-tint watermark, the thermochromatic ink can be arranged to influence the watermark's payload when activated. Similarly, if the machine-readable code is a 2D symbology, the thermochromatic ink can be provided to cooperate with the 2D code in a manner to evidence an observation. A scanner is provided to heat the ink (perhaps through microwave or intense light) to a predetermined temperature. The machine-readable code is altered at the predetermined temperature to evidence the observation of the machine-readable code.

While we have illustrated our change-with-observation machine-readable code with respect to a LCM watermark, the present invention is not so limited. Indeed, we can provide other types of machine-readable codes (e.g., other watermarks, barcodes, 2D symbologies, etc.) that have characteristics that change with observation. One change can be fluorescence intensity or decay time. An ink can be designed to have a limited number of possible excitations, and after the limited number is reached, the ink will no longer fluoresce. Each observation changes the ink—and thus the signal. (In a purely digital world, a watermark or watermark embedder can be designed to change the watermark with each observation, e.g., each time a user accesses a watermarked digital image, the watermark changes. The changes can be reflected as a numeric counter, with bits being altered by the watermark or watermark embedder/reader to reflect the number of observations.)

(A related implementation measures a decay rate of materials. That is, some materials decay (or emit) with exposure to certain stimulus. The decay rate, or a decay in response to the certain stimulus, is measured to ascertain a change with observation. Certain photosensitive materials and ink respond in this manner. Other materials are known to those of ordinary skill in the art.)

CONCLUDING REMARKS

The foregoing are just exemplary implementations of the present invention. It will be recognized that there are a great number of variations on these basic themes. The foregoing illustrates but a few applications of the detailed technology. There are many others.

The section headings in this application are provided merely for the reader's convenience, and provide no substantive limitations. Of course, the disclosure under one section heading may be readily combined with the disclosure under another section heading.

To provide a comprehensive disclosure without unduly lengthening this specification, each of the above-mentioned patent documents is herein incorporated by reference. The particular combinations of elements and features in the above-detailed embodiments are exemplary only; the interchanging and substitution of these teachings with other teachings in this application and the incorporated-by-reference patents/applications are also contemplated.

It should be recognized that our inventive methods can be applied to many types of printed objects, including, but not limited to: checks, traveler checks, banknotes, legal documents, identification documents, printed documents, in-mold designs, printed plastics, product packaging, labels and photographs. And, as we have discussed above, our techniques will benefit many types of machine-readable codes, and is not limited to LCM-type watermarking.

The use of the term "UV ink" is sometimes used herein to mean an ink that is excited by UV or IR and emits in either of the UV, IR or visible spectrums. Thus, while the disclosure uses terms like "fluoresce" to sometimes describe emissions, the reader should not assume that UV ink emissions are limited to detection in the visible spectrum; but, instead, some UV inks may produce emissions that are detected in either the UV or IR spectrums upon appropriate excitation.

The term "decay" is broadly used throughout this patent document. For instance, decay may imply that fluorescence or emissions are extinguished. Or decay may imply that such have fallen below a threshold level (e.g., based on detection or interference levels). In some cases, decay implies that fluorescence or emissions have started to decay, such as after a falling edge of a UV pulse.

A few additional details regarding digital watermarking are provided for the interested reader. Digital watermarking systems typically have two primary components: an encoder that embeds the watermark in a host media signal, and a decoder (or reader) that detects and reads the embedded watermark from a signal suspected of containing a watermark. The encoder can embed a watermark by altering the host media signal. The decoding component analyzes a suspect signal to detect whether a watermark is present. In applications where the watermark encodes information, the decoder extracts this information from the detected watermark. Data can be communicated to a decoder, e.g., from an optical sensor (e.g., a web camera, digital camera, scanner, etc.).

A watermark can have multiple components, each having different attributes. To name a few, these attributes include function, signal intensity, transform domain of watermark definition (e.g., temporal, spatial, frequency, etc.), location or orientation in host signal, redundancy, level of security (e.g., encrypted or scrambled), etc. The components of the watermark may perform the same or different functions. For example, one component may carry a message, while another component may serve to identify the location or orientation of the watermark. Moreover, different messages may be encoded in different temporal or spatial portions of the host signal, such as different locations in an image or different time frames of audio or video. In some cases, the components are provided through separate watermarks.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminance, local or relative contrast changes, etc. The surface texture of an object may be altered to create a watermark pattern. This may be accomplished by manufacturing an object in a manner that creates a textured surface or by applying material to the surface (e.g., an invisible film or ink) in a subsequent process. Watermarks can also be optically implemented in holograms or embedded in conventional paper watermarks.

If a document includes an image, photograph, graphic, line art or artwork, these features may be subtly altered to embed a watermark.

Some techniques for embedding and detecting watermarks in media signals are detailed in the assignee's U.S. Pat. Nos. 6,122,403, 6,449,377 and 6,614,914, and PCT patent application PCT/US02/20832 (published as WO 03/005291), which are each herein incorporated by reference. In this disclosure it should be understood that references to watermarking and steganographic data hiding encompass not only the assignee's technology, but can likewise be practiced with other steganographic technologies as well.

The above-described methods and functionality can be facilitated with computer executable software stored on computer readable media, such as electronic memory circuits, RAM, ROM, magnetic media, optical media, memory sticks, hard disks, removable media, etc., etc. Such software may be stored and executed on a general-purpose computer, or on a server for distributed use. Instead of software, a hardware implementation, or a software-hardware implementation can be used.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A printed document including a machine-readable signal comprising:

a first set of print structures conveyed with first ink; and a second set of print structures convey with optical variable ink, the second set of print structures comprises breaks in lines, with the second set of print structures conveying a machine-readable plural-bit auxiliary signal, wherein the second set of print structure are provided to cooperate with the first set of print structures so that at a first observation angle the first set of print structures and the second set of print structures appear to provide a first visibly perceptible feature; and wherein at a second observation angle the second set of print structures appear less observable so that the first set of print structures and the second set of print structures provide a second visibly perceptible feature.

2. The printed document of claim 1, wherein the first set of print structures and the second set of print structures comprise lines at the first observation angle.

3. The printed document of claim 1 wherein the breaks are due to the appearance of the optical variable ink at the second observation angle.

4. The printed document of claim 1 wherein the first set of print structures does not convey the plural-bit auxiliary signal.

5. The printed document of claim 1, wherein the printed document comprises at least one of an identification document, check, banknote, product packaging, label or legal document.

6. The printed document of claim 1, wherein the first visibly perceptible feature and the second visibly perceptible feature are each machine-readable.

7. The method of claim 1 wherein the machine-readable plural-bit auxiliary signal is only detectable either at the first observation angle or the second observation angle, but not at both angles.

8. A computer readable medium comprising instructions or circuitry to perform the method of claim 7.

9. A computer readable medium comprising instructions or circuitry to perform the method of claim 1.

10. A method comprising:
    providing a first set of print structures on a surface with first ink; and
    providing a second set of print structures on the surface with optical variable ink, the second set of print structures comprises breaks in one or more lines, with the second set of print structures conveying a machine-readable plural-bit auxiliary signal,
    the second set of print structure are provided to cooperate with the first set of print structures so that at a first observation angle the first set of print structures and the second set of print structures appear to provide a first visibly perceptible feature, and
    at a second observation angle the second set of print structures appear less observable so that the first set of print structures and the second set of print structures provide a second visibly perceptible feature.

11. The method of claim 10 where the first set of print structures and the second set of print structures comprise lines at the first observation angle.

12. The method of claim 10 where the breaks are due to the appearance of the optical variable ink at the second observation angle.

13. The method of claim 10 where the printed document comprises at least one of an identification document, check, banknote, product packaging, label or legal document.

14. The method of claim 10 where the first visibly perceptible feature and the second visibly perceptible feature are each machine-readable.

15. The method of claim 10 wherein the machine-readable plural-bit auxiliary signal is only detectable either at the first observation angle or the second observation angle, but not at both angles.

16. A computer readable medium comprising instructions or circuitry to perform the method of claim 15.

17. A computer readable medium comprising instructions or circuitry to perform the method of claim 10.

18. The method of claim 10 where said act of providing a first set of print structures and said act of providing a second set of print structures are controlled with a processor or printing device.

19. A method comprising:
    using a printing device: i) providing a first set of print structures on a surface with first ink, and ii) providing a second set of print structures on the surface with optical variable ink, the second set of print structures comprises breaks in one or more lines, with the second set of print structures conveying a machine-readable plural-bit auxiliary signal,
    the second set of print structure are provided to cooperate with the first set of print structures so that at a first observation angle the first set of print structures and the second set of print structures appear to provide a first visibly perceptible feature, and
    at a second observation angle the second set of print structures appear less observable so that the first set of print structures and the second set of print structures provide a second visibly perceptible feature.

20. The method of claim 19 where the first set of print structures and the second set of print structures comprise lines at the first observation angle.

21. The method of claim 19 where the breaks in one or more lines are due to the appearance of the optical variable ink at the second observation angle.

22. The method of claim 19 where the printed document comprises at least one of an identification document, check, banknote, product packaging, label or legal document.

23. The method of claim 19 where the first visibly perceptible feature and the second visibly perceptible feature are each machine-readable.

\* \* \* \* \*